May 25, 1926. 1,586,215
W. PETSCHEL
STORAGE BATTERY CLOSURE AND METHOD OF FORMING THE SAME
Filed March 31, 1923
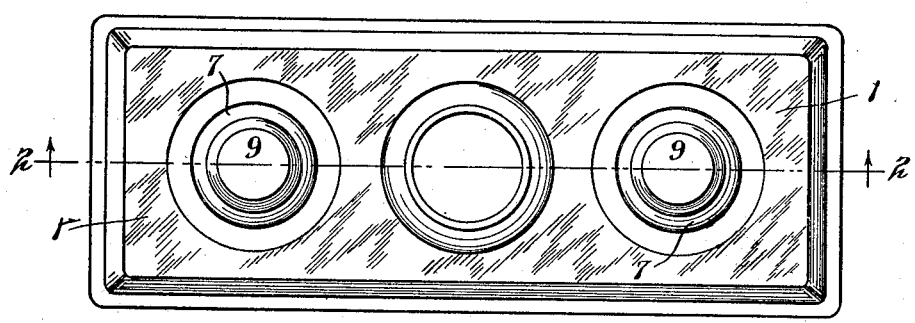
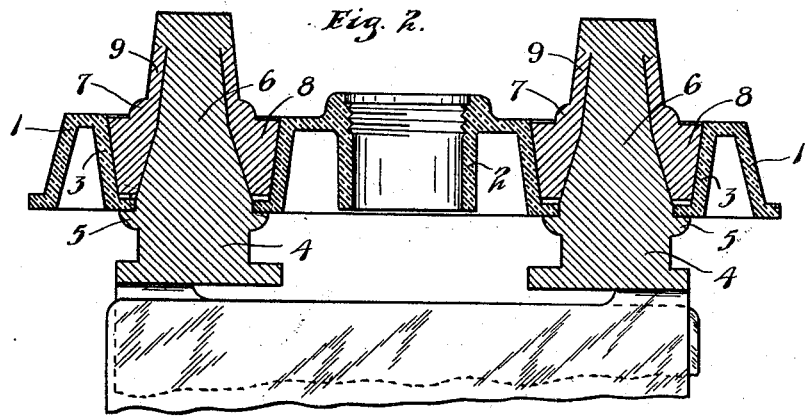
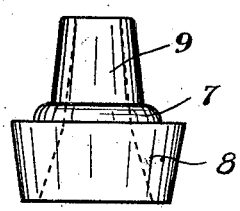
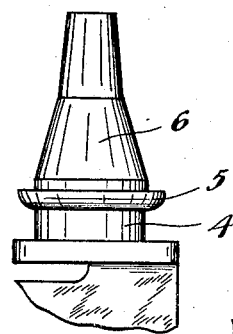
INVENTOR.
WILLIAM PETSCHEL.
BY HIS ATTORNEY.

Patented May 25, 1926.

1,586,215

UNITED STATES PATENT OFFICE.

WILLIAM PETSCHEL, OF OWATONNA, MINNESOTA, ASSIGNOR TO CARL K. BENNETT, OF OWATONNA, MINNESOTA.

STORAGE-BATTERY CLOSURE AND METHOD OF FORMING THE SAME.

Application filed March 31, 1923. Serial No. 628,994.

This invention relates to a structure of terminal posts and plates in which they are secured and the method of constructing the same, and while the invention is capable of many applications, it is particularly designed as a post structure for storage batteries. Storage batteries are now used in large numbers in automobiles and other places and usually comprise a container carrying liquid and the battery plates, which container is equipped with a cover through which the terminal post projects and as the batteries are subjected to much jolting, trouble has heretofore been experienced in the liquid therein, which is usually acid, leaking out through the cover or around the post and attacking and thus damaging and destroying the post.

It is an object of this invention, therefore, to provide a post structure and method of making the same, which forms a tight and perfect seal in the cover, so that no leakage can occur around the same.

It is a further object of the invention to provide such a closure comprising a post extending through a recess in the cover and having a bushing forced thereon and into tight engagement with the recess, which bushing is then welded to the post.

It is more specifically an object of the invention to provide such a post having a flange engaging the inside of the cover and having a conical portion extending through a conical recess in the cover, the conical portion of the post slanting oppositely to the conical portion of the recess. A bushing is then forced over the post, which bushing fits the conical portion of the post and the conical recess in the cover and the bushing and post are then welded together.

These and other objects and advantages of the invention will be fully set forth in the following description made in connection with the accompanying drawing, in which like reference characters refer to the same parts throughout the different views and, in which Fig. 1 is a plan view of a cover with the post therein;

Fig. 2 is a vertical section taken on line 2—2 of Fig. 1;

Fig. 3 is a view in side elevation of one of the posts with a portion of a plate secured thereto; and Fig. 4 is a view in side elevation of one of the bushings.

Referring to the drawings, a cover 1 for a storage battery is shown, which is of general rectangular shape in plan and has formed therein a central sleeve 2, which is threaded to receive a closure member. At each side of the sleeve 2, the cover is formed with conical wells 3, which are smaller at their bottoms and centrally apertured to form a narrow inwardly extending flange at their bottom portions. These wells thus have therein conical or frusto-conical recesses. Posts 4 are provided which are adapted to carry the plates of the battery at their bottom portions and which are equipped above said portion with a circumferential flange 5, which as shown in Fig. 2 is adapted to fit against the bottom of the wells 3. Immediately above the flange 5, the posts are of cylindrical formation and of substantially the same diameter as the aperture in the bottom of the wells. Above this cylindrical portion, the posts are formed with a conical or frusto-conical portion 6, from which portion projects upwardly a cylindrical or slightly conical portion. A bushing member 7 is provided having a lower frusto-conical portion 8 arranged to fit in the recess in the well 3 and having an upper frusto-conical portion 9. Said bushing is provided with a central recess so formed as to fit over the portion 6 of the post and the upper portion of the post extending above the portion 6.

In assembling the structure, the posts 5 are placed in position in the wells 3 with the flange 5 in contact with the bottom of said wells. The posts are then supported on a plate and the bushings 7 are placed on the posts and forced downwardly thereon with great pressure. The bushings 7 thus have the portion 8 forced against the sides of the wells 3, so that a very tight fit and close contact is made between said portion 8 and the inside of the wells 3. The bushings will at the same time move into the very close engagement with the outer surface of the posts. The bushings are arranged, however, so that an exceedingly tight fit is secured between the same and the inside of the wells 3. In actual practice, the bushings do not extend clear to the bottom of the wells, so that there is generally a small space below the bushing. A gasket may or may not be used below the bushing, as the gasket is really unnecessary owing to the very tight fit of the bushing in the well. After the bushings have thus been forced into place, the same are heated by any suitable means and the tops of the bushing and the post are welded or fused together so as to form one integral piece. After this operation, it will be seen that a closure structure comprising one integral piece of metal is formed, which is very tightly fitted into the cover 1 and which can not move therein. It is impossible, therefore, for the post or bushing to be jarred loose. A tight seal is thus always preserved between the bushing and the cover 1. In the heating of the bushing, the inner surface of the well is also somewhat heated and as the cover is usually made of gutta-percha or rubber compound, a very intimate contact is created between the bushing and the cover. The post and bushing preferably are made of lead or a lead alloy and as has been indicated, the bushing is a trifle larger than the recess in the well of the cover, so that a tight fit between the same is insured.

From the above description, it is seen that applicant has produced an extremely efficient closure for the purpose described, which is at the same time very simple. An absolutely tight seal is formed in the cover, the life or durability of which is co-existent with the life of the battery casing and cover. Not only is a tight seal formed, but a very rigid and solid terminal structure is provided. Such a terminal structure is subjected to a frequent vibration and jerking by the attached cables, while in use and with applicant's structure, the terminal will withstand such vibration and will not be loosened.

The parts of the device are easily formed and the assembling operation is quite simple, so that the closure structure is easily and inexpensively made.

It will, of course, be understood that various changes may be made in the form of the closure parts and in the steps of method without departing from the scope of applicant's invention, which generally stated consists in the matter shown and described and set forth in the appended claims.

What is claimed is:

1. A closure structure for a storage battery comprising in combination a cover for the battery having a conical apertured well formed therein with upwardly flaring sides, a battery post fitting within said well and having downwardly flaring sides, said post having a flange contacting the lower bottom surface of said well and a hollow bushing having upwardly flaring outer side surfaces and downwardly flaring inner side surfaces, said inner side surface of said bushing being adapted to fit around the flaring sides of said post, the bottom surface of said bushing being of slightly greater diameter than the lower portion of said well, said outer side surfaces of said bushing wedging downwardly against the upwardly flaring side surfaces of said well, said bushing having an upwardly extending portion fused with the upper end of said post.

2. A closure structure for a storage battery comprising in combination a battery cover having a conical upwardly flaring well therein, said well having an inwardly extending apertured flange at its bottom, a post extending through said aperture and having a flange in engagement with the bottom of the flange in said well, said post having a conical portion disposed in said well with its sides slanting oppositely to the sides of said well, a bushing disposed over said post and apertured to fit the same, said bushing being of truncated conical shape, the smaller and lower truncated surface thereof being of slightly greater diameter than the diameter of said well adjacent said flange, the conical outer surface of said bushing being wedged tightly downwardly against the sides of said well to within a short distance from the bottom of the well, and forming the sole contact between said bushing and cover, said bushing having an upwardly extending sleeve fused with the upper end of said post.

In testimony whereof I affix my signature.

WILLIAM PETSCHEL.